(12) United States Patent
Romano et al.

(10) Patent No.: US 10,358,938 B2
(45) Date of Patent: Jul. 23, 2019

(54) UNDULATING STATOR FOR REDUCING THE NOISE PRODUCED BY INTERACTION WITH A ROTOR

(71) Applicant: SNECMA, Paris (FR)

(72) Inventors: Pascal Jérôme Romano, La Celle Saint Cloud (FR); Norman Bruno André Jodet, Maisons-Alfort (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 427 days.

(21) Appl. No.: 14/790,964

(22) Filed: Jul. 2, 2015

(65) Prior Publication Data

US 2016/0003095 A1 Jan. 7, 2016

(30) Foreign Application Priority Data

Jul. 3, 2014 (FR) ...................... 14 56411

(51) Int. Cl.
*F01D 5/02* (2006.01)
*F01D 5/14* (2006.01)
(Continued)

(52) U.S. Cl.
CPC ............... *F01D 25/04* (2013.01); *F01D 5/02* (2013.01); *F01D 5/141* (2013.01); *F01D 5/145* (2013.01);
(Continued)

(58) Field of Classification Search
CPC . F01D 5/141; F01D 9/00; F01D 25/04; F01D 25/06; F04D 29/544; F04D 29/663;
(Continued)

(56) References Cited

U.S. PATENT DOCUMENTS 3,572,962 A 3/1971 Embleton
3,745,629 A 7/1973 Pask
(Continued)

FOREIGN PATENT DOCUMENTS

EP 2 014 870 A2 1/2009
FR 2 983 261 A1 5/2013
(Continued)

OTHER PUBLICATIONS

V. Clair, C. Polacsek, T. Le Garrec, G. Reboul, M. Gruber, and P. Joseph. "Experimental and Numerical Investigation of Turbulence-Airfoil Noise Reduction Using Wavy Edges", AIAA Journal, vol. 51, No. 11 (2013), pp. 2695-2713.*
(Continued)

*Primary Examiner* — Ninh H. Nguyen
*Assistant Examiner* — Brian P Wolcott
(74) *Attorney, Agent, or Firm* — Christensen O'Connor Johnson Kindness PLLC

(57) ABSTRACT

A stator designed to be placed radially in a flow which passes through one or more rotors which share the same axis of rotation, with a leading edge and a trailing edge. The leading edge and trailing edge are connected by a lower face and an upper face, wherein at least one of the faces of the stator has radial undulations which extend axially from the leading edge to the trailing edge. The radial undulations can have at least two bosses in the same azimuth direction, the amplitude of which is at least one centimeter on at least part of the axial length of the stator. A propulsion assembly formed by the rotor and the stator, and to a turbine engine comprising such assembly is also provided.

13 Claims, 2 Drawing Sheets

(51) Int. Cl.
  *F01D 9/04*   (2006.01)
  *F01D 25/04*  (2006.01)
  *F04D 29/54*  (2006.01)
  *F04D 29/66*  (2006.01)
  *F04D 29/68*  (2006.01)
(52) U.S. Cl.
  CPC ........... *F01D 9/041* (2013.01); *F04D 29/544* (2013.01); *F04D 29/663* (2013.01); *F04D 29/681* (2013.01); *F05D 2220/30* (2013.01); *F05D 2240/121* (2013.01); *F05D 2240/122* (2013.01); *F05D 2240/123* (2013.01); *F05D 2240/124* (2013.01); *F05D 2250/184* (2013.01); *F05D 2250/611* (2013.01); *F05D 2260/961* (2013.01); *Y02T 50/673* (2013.01)
(58) Field of Classification Search
  CPC ............... F04D 29/681; F05D 2250/61; F05D 2250/611; F05D 2250/184; F05D 2260/961
  See application file for complete search history.

(56) References Cited

U.S. PATENT DOCUMENTS

| | | | |
|---|---|---|---|
| 9,249,666 B2 * | 2/2016 | Wood | .................... F04D 29/324 |
| 2012/0061522 A1 | 3/2012 | Sullivan | |
| 2013/0164488 A1 | 6/2013 | Wood | |
| 2014/0255178 A1 | 9/2014 | Oudin | |

FOREIGN PATENT DOCUMENTS

| | | | |
|---|---|---|---|
| WO | 2014/026246 A1 | 2/2014 | |
| WO | WO 2014026246 A1 * | 2/2014 | ............... B64C 3/16 |

OTHER PUBLICATIONS

Rapport de Recherche Préliminaire, mailed Mar. 5, 2015, issued in corresponding French Application No. 1456411, filed Jul. 3, 2014, 3 pages.

* cited by examiner

UNDULATING STATOR FOR REDUCING THE NOISE PRODUCED BY INTERACTION WITH A ROTOR

FIELD OF THE DISCLOSURE

The present embodiments of disclosure relate to the field of propulsion units comprising a stator which is in fluid interaction with a rotor. More particularly, they relate to the design of a stator for reducing the tonal noise produced by the assembly, without making active devices intervene.

BACKGROUND OF THE DISCLOSURE

In particular, a bypass turbojet for the propulsion of a transport aircraft comprises a fan which is generally upstream and provides an annular flow of air, with a central annular part which supplies the engine with primary flow, and a second, external annular part which is injected into the atmosphere, whilst providing a substantial fraction of the thrust. At present, on the engines, a ring of fixed fins, also known as vanes, is disposed in the secondary flow of air, downstream of the rotor, in order to rectify the flow and increase the thrust provided. These fins are generally designated by the term OGV, which is the acronym for outlet guide vane.

The passage of the air on the structures of the engine causes fluctuating pressure disturbances which are propagated, and form sources of noise which are a nuisance for the environment. In particular, the noise which is propagated in the air inlet duct of a bypass turbojet is caused almost entirely by the fan. In addition, the main source of tonal noise is generally the interaction between the fan and stator elements, whereas the broadband noise is caused in particular by turbulence.

The source of tonal noise is mainly the result of the periodic impact of the wake of the blades of the fan rotor on the fins. It has been proposed, see in particular patent EP1950383, to integrate cavities which form a Helmotz resonator in the stator in order to damp these acoustic excitations. However, this solution makes it necessary to have a certain thickness in the stator. It is not easy to apply, even by using the solution recommended in patent EP1950383, when attempting to obtain fine fins, in order to minimise the disturbances of the flow apart from the rectifier effect.

The noise is amplified if all the parts of the fin are impacted at the same time, and the local contributions are added. In comparison with this, it is known (see for example *Journal of Engineering Science and Technology Review* 6(1) (2013) 59-61) to provide the stator with forms which are inclined in the axial and/or circumferential direction, in order to assist the dephasing between the sources of noise which are located on the extension of the stator vane, relative to the wake created by the blades of the rotor.

However, these forms are not necessarily optimal from the point of view of the energy performance of the engine. In addition, in the case when the stator is for example a mast or an arm of a casing, these forms pose problems in obtaining structural resistance which makes it possible to withstand the forces sustained by the stator.

A solution considered in the article in the *AIAA Journal* Vol. 51, No. 11, November 2013 entitled "Experimental and Numerical Investigation of Turbulence-Airfoil Noise Reduction Using Wavy Edges" was to design a leading edge with sinusoidal cut-outs in order to dephase the excitations on the different parts of the leading edge. However, the leading edge is not always the only source of substantial production of noise, in particular when the profile of the stator vane is strongly three-dimensional.

SUMMARY OF THE DISCLOSURE

An object of the present disclosure is, among others, to reduce efficiently the tonal noise caused by the interaction of the stator with the rotor, for a wide range of stator forms, whilst eliminating the limitations observed in the aforementioned solutions.

For this purpose, an aspect of the present disclosure relates to an assembly comprising one or more rotors which share the same axis of rotation, and at least one stator which is designed to be placed radially in a flow which passes through said rotor(s), upstream or downstream thereof, with a leading edge and a trailing edge, said leading edge and trailing edge being connected by a lower face and an upper face, characterised in that at least one of the faces of said stator has radial undulations which extend axially from the leading edge to the trailing edge, said radial undulations having at least two bosses in the same azimuth direction, the amplitude of which is at least one centimeter on at least part of the axial length of the stator, and in that, with the assembly being designed such that the crossing of said flow by the stator creates on said undulating surface pressure fluctuations with oscillations of the temporal phase according to the radial position, the radial undulations of said face have azimuth maximums and/or minimums in the vicinity of the zero mean dephasing regions for the pressure on the undulating face.

The radial and axial directions are indicated on the stator with reference to the position which it must occupy relative to the axis of rotation of the rotors. The same applies to the definition of the azimuth. In addition, the rotors are designed to rotate in one direction and induce a mean flow in a given axial direction. The mean flow is obtained by averaging the values in at least one period of rotation of the rotors, and by eliminating the fluctuations. In the disc with fins, it corresponds to a flow which is oriented axially downstream, and is rotated in the direction of rotation of the rotors. The terms lower and upper faces, as well as the leading edge and trailing edge on the stator, are thus defined according to this direction of rotation and this axial direction of the mean flow.

The radial undulation of a face of the stator means that the cutting line of this face via a plane transverse to the axis of the rotor undulates on this plane. The cutting line thus has peaks which are oriented successively in one direction and in the opposite direction relative to a mean radial direction. A boss is thus defined as the part of this line which joins two successive peaks oriented in the same direction. The boss thus passes via an intermediate peak, oriented in the opposite direction, which in this case is known as its apex. In the remainder of the document, the orientation of the boss corresponds to the orientation of its apex, and the amplitude of the boss is the distance from the apex to the straight line joining the two peaks which surround it.

In the case when the stator is downstream of the rotor, an embodiment of the present disclosure makes it possible to dephase the radiation of the sources of noise caused by the fact that the surface of the stator crosses the flow induced by the rotor(s). In fact, by offsetting the azimuth position of the surface of at least one of the faces by means of the radial undulations, temporal dephasing is introduced at the moment when the wake of the rotor blades meets the stator. Thus, since the sources of noise located in the vicinity of the surface of the stator derived from this interaction mechanism are not emitting at exactly the same moment of passage of the wake, an effect of amplification of the noise propagated in the far field is prevented in the harmonics associated with the operation of the rotor. In addition, since the crossing of said flow by the stator on said undulating face pressure fluctuations with oscillations of the temporal phase according to the radial position, the radial undulations of said face have azimuth maximums and/or minimums of the radial profile of said face in the vicinity of the zero mean dephasing regions for the pressure on the undulating face. Thus, the regions with phase radiation are distributed geometrically according to portions of surface of the stator on which the variation of azimuth offsetting around the axis of rotation has a constant sign. This azimuth variation ensures dephasing of the noise emitted by these sources on the corresponding portion of surface.

A first advantage of the various aspects of the disclosure is derived from the fact that the undulations make it possible to introduce dephasings relative to the movement of rotation of the entire flow which passes through the stator, even if the stresses, for example structural or aerodynamic stresses, do not make it possible to use a general form of the stator with inclination in the axial and/or circumferential direction. As well as an OGV fin behind a fan, a stator of this type can be a mast which ensures the retention of a casing or of the engine, a stator vane in a compressor, or a turbine.

A second advantage of the various aspects of the disclosure is based on the fact that, in the case when the stator has a three-dimensional profile, the source of the mechanisms of production of noise by interaction of the pressure fluctuations moving in rotation in front of the profile is no longer located solely on the leading edge. The extension of the surface undulations over the entire extension of the chord of the stator makes it possible to process the sources of noise located on this entire surface.

Also according to aspects of the disclosure, the amplitude of the bosses is at least one centimeter, in order to have a significant effect on the attenuation of the tonal noise. However, this amplitude preferably continues to be less than ten centimeters.

The radial undulations of a face also correspond to oscillations of the azimuth of the points of the radial profile between the apexes of bosses and the peaks which border them. These azimuth oscillations will advantageously have at least an amplitude of two degrees.

According to aspects of the disclosure, the radial undulations have at least two bosses. For different configurations, the number of bosses can be adapted in order to maximise the geometric dephasing of the acoustic sources, taking into account the distribution of the phases on the surface of the stator. This number can generally be four, and can be as much as ten.

One solution according to aspects of the disclosure also has the advantage, in particular when the stator is upstream of the rotor, of creating disturbance of the entire wake behind the stator, with spatial oscillations. In this configuration, it is the sources of noise on the rotor blades which are dephased by the spatial oscillations of the wake of the stator, when the rotor blades pass therethrough. An effect of attenuation of the tonal noise is thus also obtained in the operating harmonics of the rotor, by means of a similar effect, when the stator is downstream.

Aspects of the disclosure also have the advantage, when the radial undulations are applied on a single face in certain configurations, of inducing geometric dephasing between the sources of noise on each face, characterised by variation of thickness which varies with the radial position. It is thus possible to reduce the levels of resulting noise.

Advantageously, the radial undulations have a wavelength which is substantially constant along the radial extension of the stator. In other words, these undulations have regular distribution between the inner radial edge and the outer radial edge of the stator.

Preferably, the amplitude of the bosses of the radial undulations is maintained as more than one centimeter from the leading edge to the trailing edge.

According to one of the features, the lower face and the upper face can have radial undulations. In this case, the undulations of the two faces can be radially in phase. In particular, when the undulations extend along the entire length of the stator, this arrangement requires the leading edge and the trailing edge themselves to be undulating. This arrangement makes it possible to maintain the thickness of the stator over the chord, and to provide improved aerodynamic performance.

According to another feature, the stator can comprise a core which is arranged to ensure the mechanical strength of said stator, and a skin which forms the radial undulations on said at least one of the faces. The core of the stator is a structural part which extends radially to the interior, and makes it possible to absorb the forces which the stator must withstand. This arrangement separates the mechanical and aerodynamic functions by providing flexibility when designing the form of the stator.

Advantageously, the radial undulations of the face of the stator are propagated axially along mean current lines in said flow. In the propulsion assembly described, the mean flow borders the lower and upper faces of the stator, going from the leading edge to the trailing edge. The term axial propagation of the radial undulations along these current lines means in particular that the position of the bosses and of the hollows of the radial undulations according to the abscissa on the axis of rotation follows current lines.

Some embodiments of the present disclosure relate to a turbine engine comprising an assembly as previously described, in which a ring of fixed guide vanes forms said stators.

Some embodiments of the present disclosure relates to a method for reducing the noise radiated by an assembly comprising one or more rotors which share the same axis of rotation, and at least one stator which is designed to be placed radially in a flow which passes through said rotor(s) upstream or downstream thereof, said stator having a leading edge and a trailing edge, said leading edge and trailing edge being connected by a lower face and an upper face, said flow creating on at least one of said lower and upper faces pressure fluctuations with temporal phase oscillations according to the radial position, characterised in that on said at least one of the lower and upper faces radial undulations are produced which extend axially from the leading edge to the trailing edge, said radial undulations having at least two bosses in the same azimuth direction, the amplitude of which is at least one centimeter on at least part of the axial length of the stator, with azimuth maximums and/or minimums in the vicinity of the zero mean dephasing regions for the pressure on said at least one of the lower and upper faces.

DESCRIPTION OF THE DRAWINGS

Aspects of the disclosure will be better understood, and other details, features and advantages thereof will become more apparent from reading the following description, with reference to the accompanying drawings, in which.

DETAILED DESCRIPTION

Figure 1:
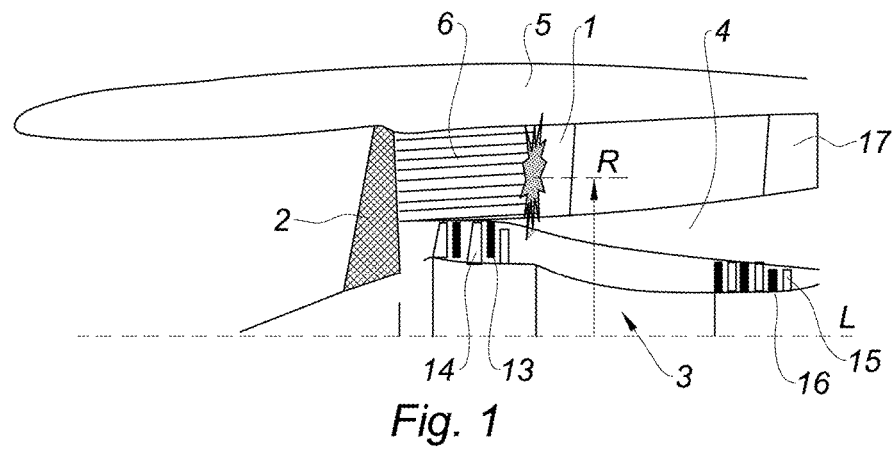
FIG. 1 shows in axial cross-section a general drawing of the arrangement of a rotor and a stator according to the disclosure in the case of a bypass turbine engine.

With reference to FIG. 1, examples of the present disclosure relate to stators formed by OGV fins 1 or fixed vanes placed in the secondary flow driven by the blades 2 of a turbine engine fan, rotating about the axis LL of rotation of an engine 3.

The fins 1 pass radially through the stream of the secondary flow, from the outer casing 4 of the engine 3 to the nacelle 5. As illustrated in FIG. 1, each fin 1 is periodically impacted by the wake 6 of each blade 2 of the fan.

Figure 2:
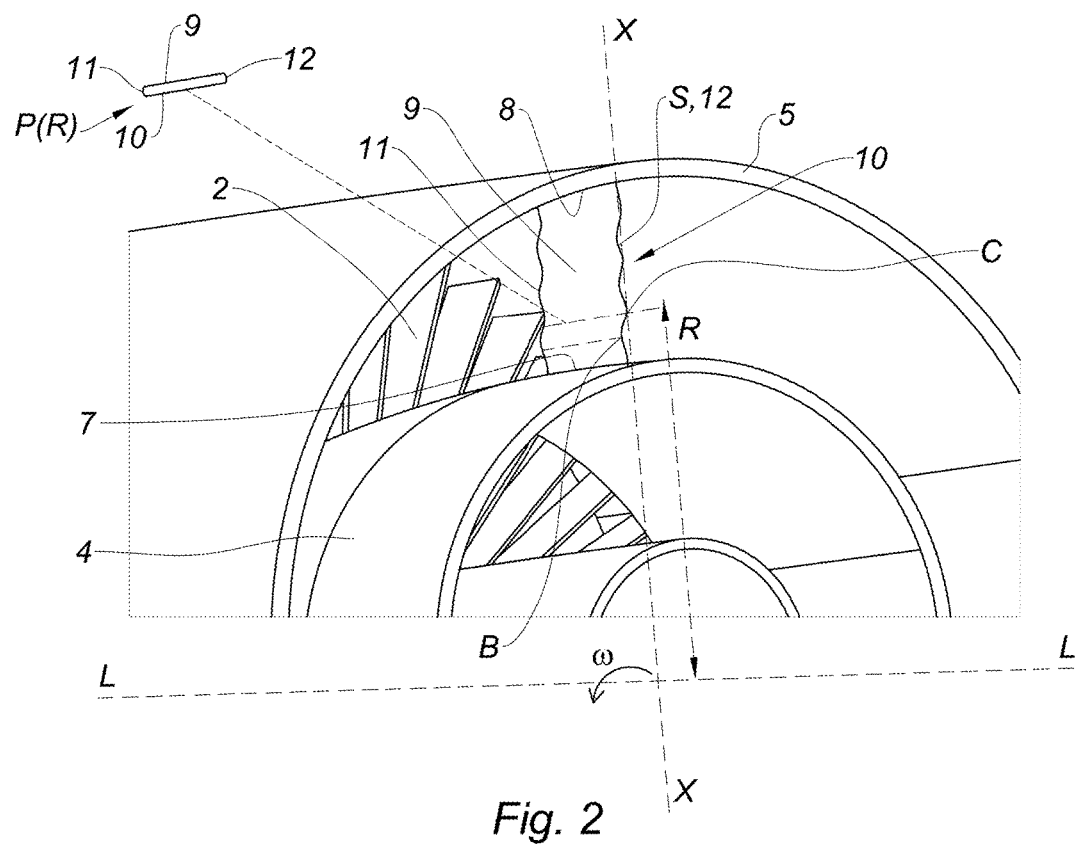
FIG. 2 shows in perspective a stator according to the disclosure behind a rotor.

With reference to FIG. 2, the fin 1 can be defined by the development of its profile P(R) in surfaces of revolution between the surface of the casing 4 and the surface of the nacelle 5. With reference to FIG. 2, the profile P(R) develops for example regularly in the interior of the stream according to the radius R, said radius R being measured between the radial position in the stream and the axis LL of rotation. The profiles P(R) at the junction of the fin 1 respectively with the casing 4 and the nacelle 5 form the inner 7 and outer 8 radial edges of this fin 1.

In the example in FIG. 2, a fin 1 of this type is placed downstream of the blades 2 of the fan, which function for example by having an anticlockwise direction of rotation ω. In this example, it is thus possible to define on the fin, relative to the flow which has passed through the fan 2, an upper face 9 and a lower face 10, as well as a leading-edge 11 and a trailing edge 12, corresponding to the lines of junction of the two faces 9, 10, upstream and downstream in the flow.

With reference to FIG. 2, in a first variant, the stacking of these profiles P(R) follows a curve S, represented here on the trailing edge 12, which undulates about a radial line XX. Again, in the example in FIG. 2, the form of the profiles P(R) is substantially constant along the radius R; in addition, the upper 9 and lower 10 faces are substantially parallel, and are separated by a small distance relative to the chord length in the axial direction, outside the regions of connection to the leading edge 11 and to the trailing edge 12. The undulations are thus propagated on the upper face 9 and lower face 10 of the fin 1, with a substantially constant amplitude.

If the term "boss" which is previously defined is restricted to local deformation of the surface corresponding to an undulation of its radial profile in a transverse cross-sectional plane in the direction of rotation w of the fan, the apex (or peak) B of a boss is a peak corresponding to the end position of an undulation in the direction of rotation ù of the fan. The peaks C of hollows which form the ends of the bosses correspond to the end position of an undulation in the other direction. The example given in FIG. 2 comprises three bosses and three hollows.

Other variants can be envisaged. The undulations on each of the faces 9, 10 can comprise up to at least ten bosses. Conversely, the number of bosses will be a minimum of two. For regularly distributed undulations, this corresponds to the fact that the radial extension of the fin 1 is at least equal to one and a half times the wavelength of the radial undulations.

The maximum value of the amplitude of the bosses, as defined at the beginning of the detailed description, defines that of the undulations on a transverse cross-sectional plane. Typically, for the turbine engines installed in aircraft, the fin 1 can be produced by using amplitudes of undulations between an apex B of a boss and a peak C of a hollow which can be at least as much as 10 cm.

Figure 4A:
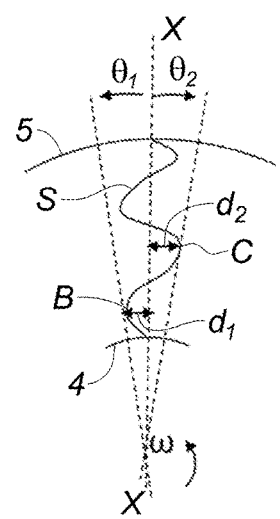
FIGS. 4a and 4b show in transverse cross-section the undulations of two embodiments of a stator according to the disclosure.

With reference to FIG. 4a, this amplitude corresponds approximately to the sum of the distance $d_1$ from the apex B of a boss on the curve S to the radial line XX, and the distance $d_2$ from a peak C of an adjacent hollow on the curve S to the radial line XX. In order to obtain the required effects as far as acoustic dephasing is concerned, this amplitude will not be less than 1 cm.

These figures can be transposed in terms of variation of the azimuth θ between the apex B of a boss and the peak C of a hollow. In relation to the typical dimensions of a turbojet with a fan, this corresponds to the fact that the variation between the azimuth $θ_1$ of the apex B of a boss and the azimuth $θ_2$ of the peak C of an adjacent hollow is a minimum of approximately two degrees.

A third important parameter in the definition of the undulations corresponds to the manner in which they are propagated axially along a face 9, 10 of the fin 1, i.e. the manner in which they develop when the transverse cross-sectional plane of the leading edge 11 to the trailing edge 12 is developed.

In the example given in FIG. 2, with the cross-sectional profiles of the fin 1 along a radius being substantially constant, the undulations follow lines which are parallel to the axis of rotation LL. They thus follow approximately the current lines of the mean flow about the fin 1, such as to minimise the head losses caused by the presence of the stator in the flow.

For various reasons, this mean flow induced by the rotor 2 during operation can give rise on the faces 9, 10 of the fin 1 to current lines which are not aligned with the axis of rotation. Preferably, in a variant, the law of development of the profiles P(R) of the fin will be adapted according to the radius R in the stream, such that the undulations on at least one of the faces 9, 10 follow the mean flow lines.

If the mean flow lines vary according to the operating regime of the engine, this variant will be adapted to the operating regime for which the maximum acoustic efficiency is required.

Figure 3:
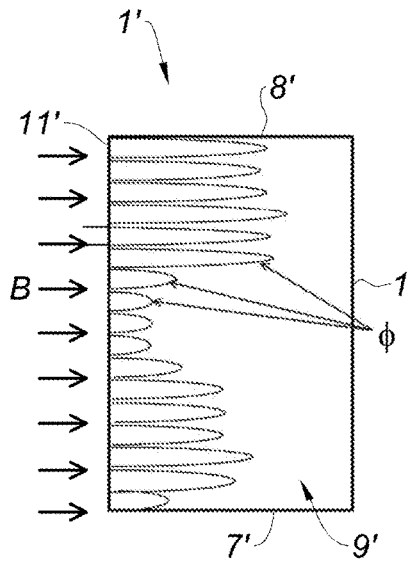
FIG. 3 shows the distribution of the phases of the pressure fluctuations in the flow on a face of a stator according to the disclosure.

By way of example, FIG. 3 illustrates the manner in which the distribution of the undulations by positioning the bosses B and the hollows C can be optimised for a particular configuration of the rotor and the stator, and with a given operating regime.

FIG. 3 shows a typical observed form of the isophase lines φ of the pressure fluctuations on the upper face 9' of a fin 1' used in place of the fin 1 according to an aspect of the disclosure, and having a flat upper face 9' defined by a leading edge 11' and a trailing edge 12' with the same axial positions as those of the fin 1. If the pressure fluctuation phase on the downstream part of the face 9' of the fin 1' is taken as a reference, these isophase curves Φ show that, going from the inner radial edge 7' to the outer radial edge 8' in the upstream part, there is passage through regions where the pressure is successively in advance of the phase then with phase delay.

This result illustrates the fact that local fluctuations in the flow, in particular in the vicinity of the wake of a blade 2 of the fan, are superimposed on the periodic overall movement caused by the rotation of the blades 2 of the rotor.

The undulations make it possible to take these phenomena into account in order to attenuate them. The horizontal arrows in front of the leading edge 11' in FIG. 3 indicate the manner in which the apexes B of the bosses are positioned in a variant which, in this case, has nine bosses. In this variant, the apexes B of the bosses and the peaks C of the hollows of the fin 1, produced with nine bosses according to the preceding description, are located between the isophase lines Φ, with fluctuations of pressure on the downstream part of the face 9'. Thus, the regions which radiate in phase on the undulating upper face 9 of the fin 1 are distributed locally on regions where the azimuth of the points of the face varies regularly. A structure of this type permits fluctuation of the acoustic waves which interact with the surface of the fin 1 by producing dephasing of the sources relative to the wake of the rotor blade 2, in order to assist the phenomena of destructive interference between the waves radiated by the different sources, such as to minimise the amplitude of the acoustic signal derived from all of the sources.

Embodiments of the present disclosure have been presented in a simple case for an OGV fin 1 extending substantially radially in the flow. However, it also relates to fins with more complex three-dimensional forms, or, for example, to other elements indicated in FIG. 1. For a turbine engine this can be:
- a stator 13 placed in the primary flow after the rotors 14 of a compressor;
- a stator 15 placed in the primary flow after the rotors 16 of a turbine;
- a mast 17 for structural retention placed in the secondary flow.

According to an embodiment which is adapted for example to the stator of a compressor, of a turbine, or for an aerodynamic optimisation of the OGV fins, the radial stacking curve S of the profiles can be spaced in particular from a radial line. Firstly, it need not be perpendicular to the axis of the rotor on a meridian plane. Secondly, it can be inclined in the circumferential direction.

Figure 4B:
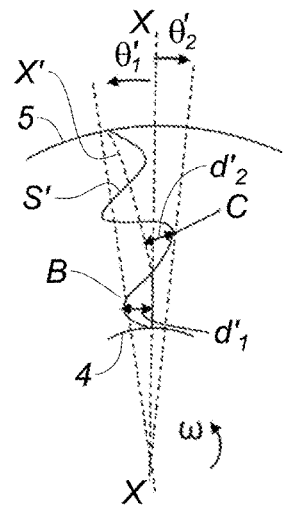

FIG. 4b illustrates an embodiment of the present disclosure of a stator according to a stacking curve S' which undulates about a mean line X' which is inclined in the circumferential direction relative to the radial line XX. Here, this variant has two bosses. In this case, the amplitude between the apex B of a boss and the peak C of an adjacent hollow must be measured taking into account the correction to be made about the mean line X'. For this variant, there is still application of the criterion of amplitude of the bosses, which corresponds approximately to the fact that the sum of the two differences $d'_1$, $d'_2$ in distance relative to the mean line X' must be greater than 1 cm. If the difference in azimuth is taken into consideration, leaving out of account the developments of X', this still involves applying the criterion indicating that an angular difference $\theta'_1 - \theta'_2$ of at least 2 degrees between the apex B of a boss and the peak C of an adjacent hollow must be respected.

Other embodiments can also be obtained by adjusting the thickness of the stator. In the example given in FIG. 2, the thickness can be considered as negligible. The faces 9, 10 of the fin 1 are in this case two surfaces which are slightly offset in the circumferential direction, and follow the same undulations relative to a flat surface.

Figure 5:
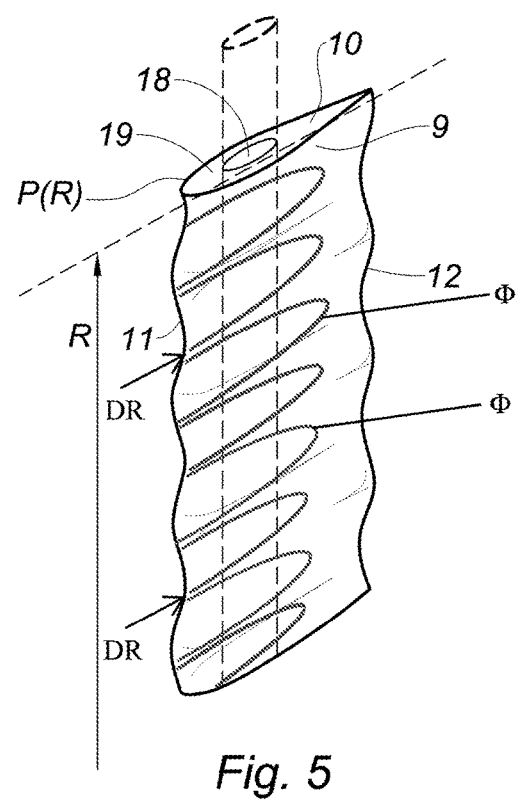
FIG. 5 shows a three-dimensional view of a stator according to the disclosure showing an increase in thickness towards the middle of the chord.

In a variant, with reference to FIG. 5, the upper 9 and lower 10 faces can correspond to a stack of profiles P(R), the thickness which varies according to the chord. These variations of thicknesses can be justified by aerodynamic and/or structural considerations.

In the variant, they make it possible for the upper and lower surfaces not to be undulating in the same manner. For example, one surface can be undulating, and the other surface can be not undulating.

In the embodiment illustrated in FIG. 5, the two faces 9, 10 of the stator are undulating. On undulating face 9, there is shown zero dephasing regions DR in relation to isophase lines φ, which were described above with reference to FIG. 3. On the other hand, this stator is produced with an inner structure 18 forming a core which provides structural strength, and a "skin" 19 which surrounds it, and produces the upper 9 and lower 10 faces of the stator which interact with the flow. As illustrated in FIG. 5, the thickness of the profile P(R) makes it possible to provide the core 18 with a substantially straight form, which is influenced little or not at all by the undulations of the surfaces 9, 10. This makes it possible to obtain the structural performances more easily, in particular if the stator is a mast 17 which must retain the elements of the engine 3.

The embodiments of the invention in which an exclusive property or privilege is claimed are defined as follows:

1. An assembly comprising a rotor having an axis of rotation, and a stator which is placed radially in a flow which passes through said rotor, said stator being placed upstream or downstream of said rotor, said stator having an inner structure forming a core extending radially and a skin surrounding the inner structure, said skin having a leading edge and a trailing edge, said leading edge and trailing edge being connected by a lower face and an upper face, wherein said leading edge and trailing edge have radial undulations and at least one of the lower and upper faces of said skin has radial undulations which extend axially from the leading edge to the trailing edge to form an undulated surface, said radial undulations having at least two bosses in the same azimuth direction, an amplitude of said radial undulations being at least one centimeter on at least part of an axial length of the stator, said stator being configured to create pressure fluctuations on said undulated surface when the flow interacts with said undulated surface, said pressure fluctuations having temporal phase oscillations according to a radial position, said radial undulations of said undulated surface having azimuth maximums and/or minimums in a vicinity of zero mean dephasing regions for pressure on said undulating surface.

2. The assembly according to claim 1, wherein the radial undulations have a wavelength which is substantially constant along a radial extension of the stator.

3. The assembly according to claim 1, wherein the amplitude of the radial undulations is maintained as more than one centimeter from the leading edge to the trailing edge.

4. The assembly according to claim 1, wherein the lower face and the upper face have the radial undulations.

5. The assembly according to claim 4, wherein the radial undulations of the upper and lower faces are radially in phase.

6. The assembly according to claim 1, wherein the core is designed to ensure a mechanical strength of said stator, and the skin forms the radial undulations on said at least one of the lower and upper faces.

7. The assembly according to claim 1, wherein the radial undulations are propagated axially along mean current lines in said flow.

8. A turbine engine comprising an assembly according to claim 1, wherein a ring of fixed guide vanes forms said stator.

9. A method for reducing the noise radiated by an assembly comprising a rotor having an axis of rotation, and a stator, the method comprising:
placing the stator radially in a flow which passes through said rotor and upstream or downstream of said rotor, said stator having a leading edge and a trailing edge, said leading edge and trailing edge being connected by a lower face and an upper face, said flow creating on at least one of said lower and upper faces pressure fluctuations with temporal phase oscillations according to a radial position, wherein radial undulations are provided on said trailing edge and leading edge, and on said at least one of the lower and upper faces which extend axially from the leading edge to the trailing edge, said radial undulations having at least two bosses in the same azimuth direction, an amplitude of said radial undulations being at least one centimeter on at least part of an axial length of the stator, with azimuth maximums and/or minimums in a vicinity of zero mean dephasing regions for pressure on said at least one of the lower and upper faces.

10. The assembly according to claim 1, wherein the amplitude of said radial undulations is less than ten centimeters.

11. A method for reducing the noise radiated by an assembly comprising a rotor having an axis of rotation, and a stator, the method comprising:
placing the stator radially in a flow which passes through said rotor and upstream or downstream of said rotor, said stator having a leading edge and a trailing edge, said leading edge and trailing edge being connected by a lower face and an upper face;
providing radial undulations on at least one of the lower and upper faces of said stator, said radial undulations extending axially from the leading edge to the trailing edge to form an undulated surface and having at least two bosses and peaks in the same azimuth direction, an amplitude of said radial undulations being at least one centimeter on at least part of an axial length of the stator;
determining isophase curves on at least one of the lower and upper faces of said stator and from an inner radially edge and an outer radial edge of said undulated surface, each isophase curve delimiting a pressure fluctuation phase on said undulated surface; and
placing each boss and/or peak between two isophase curves which form zero mean dephasing regions for pressure on said undulated surface such that each pressure fluctuation phase has temporal phase oscillations according to a position of the boss and/or peak when the flow interacts with said undulated surface.

12. The method of according to claim 11, wherein the trailing edge and the leading edge have radial undulations.

13. A turbine engine having an axis of rotation, the turbine engine comprising:
a fan and a stator, said stator being placed radially in a flow which passes through said fan, said stator being placed upstream or downstream of said fan, said stator having an inner structure forming a core extending radially and a skin surrounding the inner structure, said skin having a leading edge and a trailing edge, said leading edge and trailing edge being connected by a lower face and an upper face, wherein said leading edge and trailing edge have radial undulations and at least one of the lower and upper faces of said stator has radial undulations which extend axially from the leading edge to the trailing edge to form an undulated surface, said radial undulations having at least two bosses in the same azimuth direction, an amplitude of said radial undulations being at least one centimeter on at least part of an axial length of the stator, said stator being configured to create pressure fluctuations on said undulated surface when the flow interacts with said undulated surface, said pressure fluctuations having temporal phase oscillations according to a radial position, said radial undulations of said undulated surface having azimuth maximums and/or minimums in a vicinity of zero mean dephasing regions for pressure on said undulating surface.

\* \* \* \* \*